US012057089B2

(12) United States Patent
Hazra et al.

(10) Patent No.: US 12,057,089 B2
(45) Date of Patent: *Aug. 6, 2024

(54) MODIFYING RENDERED IMAGE DATA BASED ON AMBIENT LIGHT FROM A PHYSICAL ENVIRONMENT

(71) Applicant: Apple Inc., Cupertino, CA (US)

(72) Inventors: Siddharth Shankar Hazra, Milpitas, CA (US); Ralf Habel, Cupertino, CA (US); Anselm Grundhoefer, Campbell, CA (US); Aleksandr M. Movshovich, Santa Clara, CA (US); Moinul Khan, San Jose, CA (US); Marwan Hussein, San Jose, CA (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/101,779

(22) Filed: Jan. 26, 2023

(65) Prior Publication Data

US 2023/0290321 A1    Sep. 14, 2023

Related U.S. Application Data

(63) Continuation of application No. 18/072,045, filed on Nov. 30, 2022, now abandoned, which is a
(Continued)

(51) Int. Cl.
*G09G 5/10*  (2006.01)
*G02B 27/01*  (2006.01)
(Continued)

(52) U.S. Cl.
CPC ............. *G09G 5/10* (2013.01); *G02B 27/017* (2013.01); *G06T 19/006* (2013.01);
(Continued)

(58) Field of Classification Search
CPC ............. G02B 27/017; G02B 27/0172; G02B 2027/0118; G06T 19/006; G09G 5/10
See application file for complete search history.

(56) References Cited

U.S. PATENT DOCUMENTS 9,799,256 B2    10/2017  Yoshiyama et al.
11,715,405 B1*  8/2023  Ratnasingam ......... G09G 3/002
                                                  345/204
(Continued)

*Primary Examiner* — Xuemei Zheng
(74) *Attorney, Agent, or Firm* — Fernando & Partners, LLP

(57) ABSTRACT

A method includes obtaining rendered image data that includes a representation of an object for display using a see-through display. The see-through display permits ambient light from a physical environment through the see-through display. The method includes sensing a plurality of light superposition characteristic values associated with the ambient light that quantifies the ambient light. The method includes determining a plurality of display correction values associated with the electronic device based on the plurality of light superposition characteristic values and predetermined display characteristics of the representation of the object. The method includes generating, from the rendered image data, display data for the see-through display in accordance with the plurality of display correction values in order to satisfy the predetermined display characteristics of the representation of the object within a performance threshold.

25 Claims, 17 Drawing Sheets

Related U.S. Application Data continuation of application No. 17/158,402, filed on Jan. 26, 2021, now Pat. No. 11,545,108.

(60) Provisional application No. 62/969,549, filed on Feb. 3, 2020.

(51) Int. Cl.
*G06T 19/00* (2011.01)
*G01J 1/42* (2006.01)
*G09G 3/22* (2006.01)

(52) U.S. Cl.
CPC ..... *G01J 1/4204* (2013.01); *G02B 2027/0118* (2013.01); *G02B 27/0172* (2013.01); *G09G 3/22* (2013.01); *G09G 2360/14* (2013.01)

(56) References Cited

U.S. PATENT DOCUMENTS

| | | |
|---|---|---|
| 2011/0279355 A1 | 11/2011 | Yasue et al. |
| 2017/0270707 A1 | 9/2017 | Kass |
| 2017/0352173 A1 | 12/2017 | Salmimaa et al. |
| 2019/0094554 A1 | 3/2019 | Benesh et al. |
| 2021/0375232 A1* | 12/2021 | Ratnasingam ........... G09G 5/10 |
| 2023/0267860 A1* | 8/2023 | Habel .................... G09G 3/001 |
| | | 345/590 |
| 2023/0298541 A1* | 9/2023 | Rangaprasad ....... H04N 1/6088 |
| | | 345/22 |

* cited by examiner

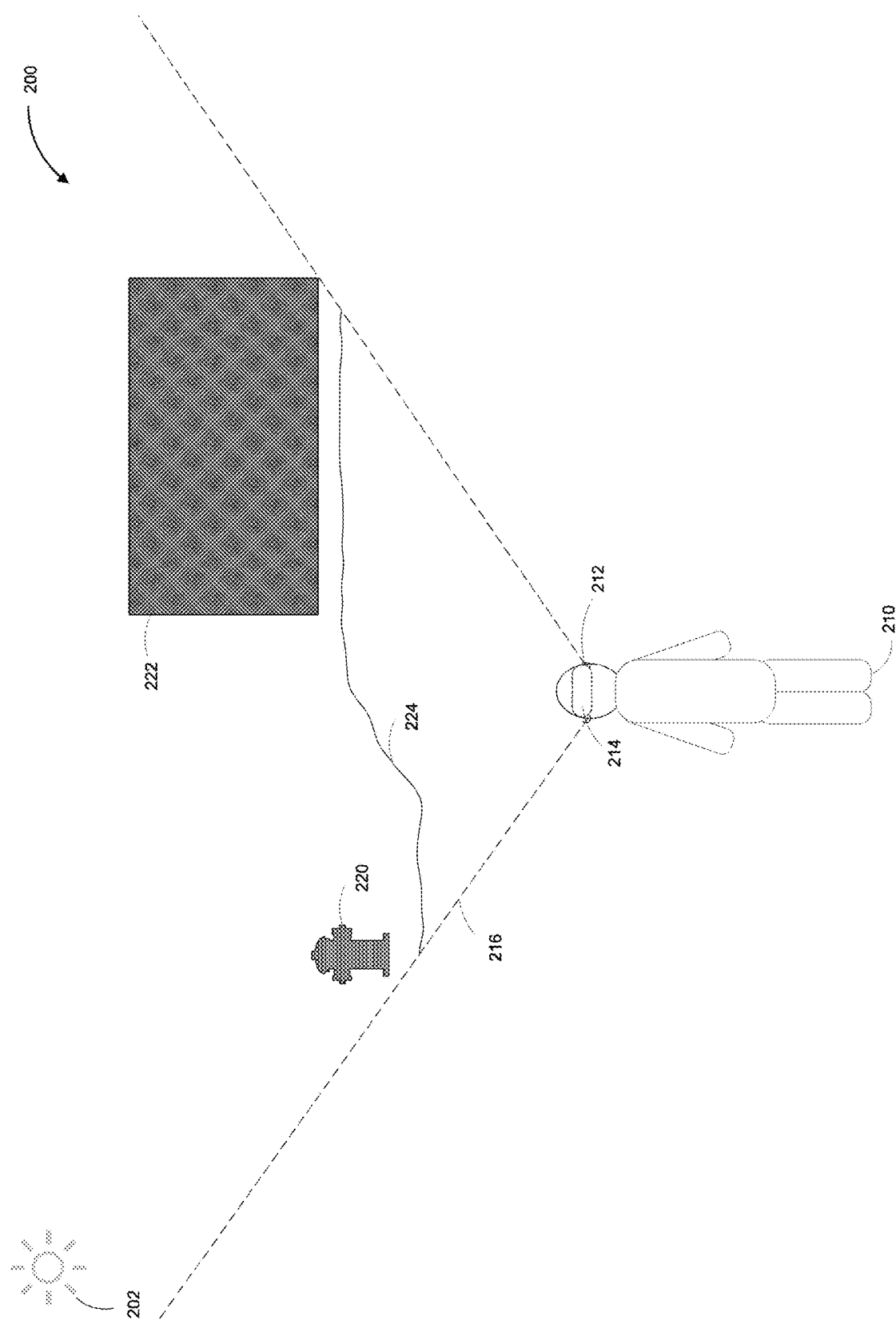

MODIFYING RENDERED IMAGE DATA BASED ON AMBIENT LIGHT FROM A PHYSICAL ENVIRONMENT

CROSS-REFERENCE TO RELATED APPLICATION

This application is a continuation application and claims priority to U.S. patent application Ser. No. 18/072,045, filed on Nov. 30, 2022, which is a continuation of U.S. patent application Ser. No. 17/158,402, filed on Jan. 26, 2021, which claims priority to U.S. Provisional Pat. App. No. 62/969,549 filed on Feb. 3, 2020, which are all hereby incorporated by reference in their entirety.

TECHNICAL FIELD

The present disclosure relates to modifying image data, and, in particular, modifying rendered image data as a function of ambient light from a physical environment.

BACKGROUND

In augmented reality (AR), computer-generated content is composited with a user's physical environment to overlay computer-generated visual content on top of real-world objects. A user may experience AR content by wearing a head mounted display (HMD) that includes a see-through display, which, in turn, allows the pass-through of light from the user's physical environment to the user's eyes. The HMD operates as an additive display by projecting AR content to be guided by the see-through display to the user's eyes; or, directly at the user's retinas, where pass-through light from the physical environment and the projected light of the AR content concurrently reach the retinas. The HMD adds computer-generated content to user's physical environment.

In some circumstances, however, light from the physical environment has a color composition, frequency of spatially varying contrast, and/or luminance property that interferes with computer-generated content in a manner that degrades the AR experience. For example, light from the physical environment may limit the perceived contrast between the physical environment and displayed computer-generated content. As another example, color composition of the physical environment, such as the presence of predominantly one color, may interfere with the color composition of displayed computer-generated content by providing dominant hues that are difficult to mask using additive display methods and hardware.

Using a graphics processing unit (GPU) for processing image data is computationally expensive (e.g., power hungry) and may introduce undesirable latency. For example, per-pixel modification is problematic for a mobile device because the high computational demands result in high levels of heat dissipation.

SUMMARY

In accordance with some implementations, a method is performed at an electronic device with one or more processors, a non-transitory memory, and a see-through display. The method includes obtaining rendered image data that includes a representation of an object for display using the see-through display. The see-through display permits ambient light from a physical environment through the see-through display. The method includes sensing a plurality of light superposition characteristic values associated with ambient light from the physical environment. The plurality of light superposition characteristic values quantifies the ambient light arriving at the see-through display. The method includes determining a plurality of display correction values associated with the electronic device based on the plurality of light superposition characteristic values and predetermined display characteristics of the representation of the object. The method includes generating, from the rendered image data, display data for the see-through display in accordance with the plurality of display correction values in order to satisfy the predetermined display characteristics of the representation of the object within a performance threshold.

In accordance with some implementations, an electronic device includes one or more processors, a non-transitory memory, and a see-through display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIGS. 2A-2G are an example of light from a physical environment interfering with display of an object.

SUMMARY

Figure 1:
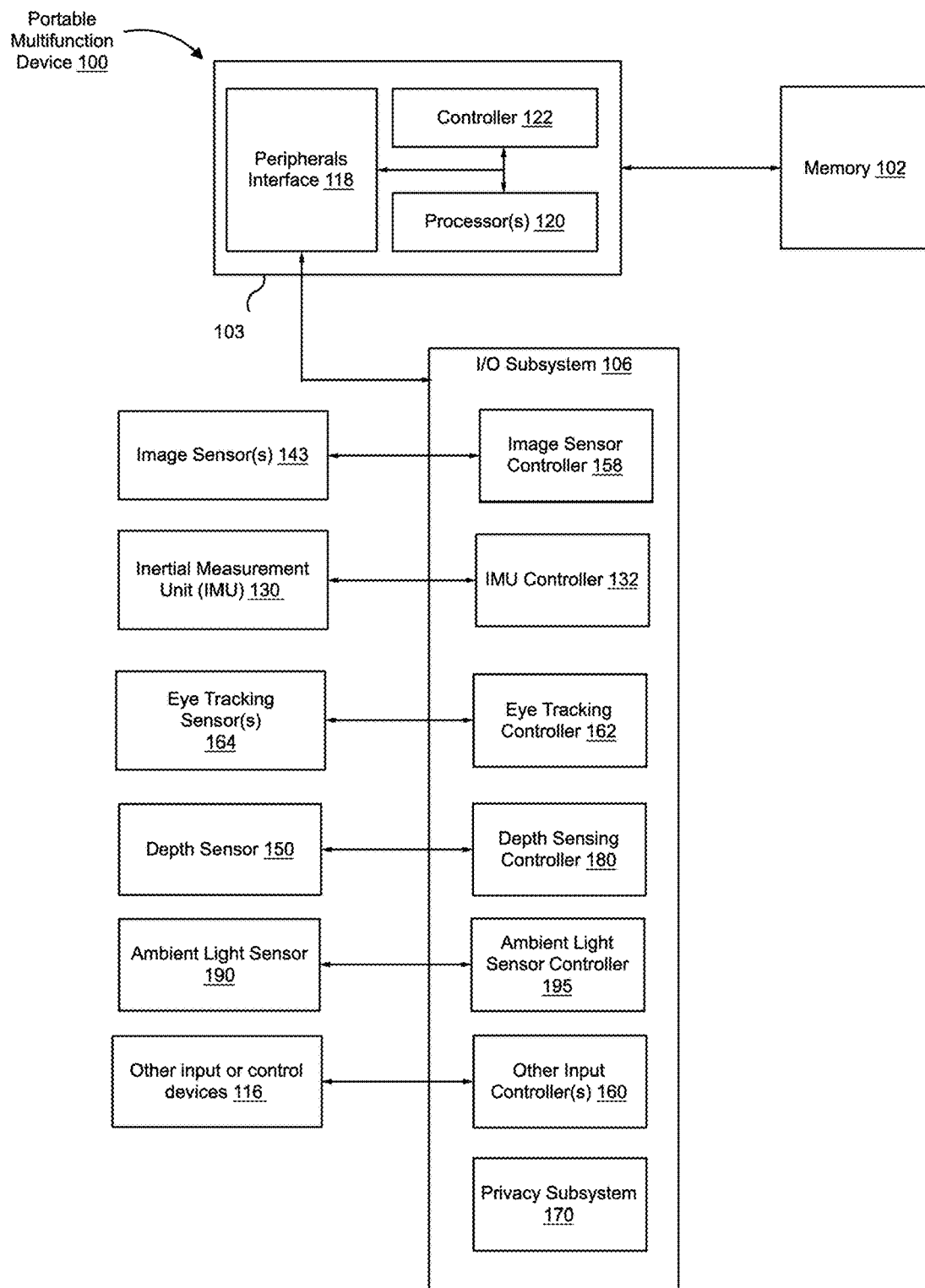
FIG. 1 is a block diagram of an example of a portable multifunction device in accordance with some implementations.

In AR display systems, computer-generated content is composited with a user's physical environment in order to overlay computer-generated visual content on top of real-world objects. A user may experience AR content by wearing an HMD that includes a see-through display, which, in turn, allows the pass-through of light from the user's physical environment to the user's eyes. The HMD operates as an additive display by projecting AR content to be guided by the see-through display to the user's eyes. In some circumstances, however, light from the physical environment has a color composition and/or brightness that interferes with computer-generated content in a manner that degrades the AR experience. For example, light from the physical environment limits a level of contrast between the physical environment and displayed computer-generated content. As another example, color composition of the physical environment, such as the presence of predominantly one color, may interfere with the color composition of displayed computer-generated content by providing dominant hues that are difficult to mask using additive display methods and hardware. Using a graphics processing unit (GPU) in order to address the effects of the ambient lights from the physical environment is computationally expensive (e.g., power hungry) and may introduce undesirable latency into the graphics rendering pipeline.

By contrast, various implementations disclosed herein provide methods, electronic devices, and systems for modifying rendered (e.g., by a GPU) image data based on sensed light superposition characteristic values associated with ambient light from the physical environment. In some implementations, a variety of sensors (e.g., ambient light sensor, image sensor, depth sensor, head pose sensors, etc.) are utilized to sense the light superposition characteristic values. The resultant generated display data accounts for the adverse light effects, while avoiding the high computational demands associated with using a GPU. For example, a rendered dark grey computer-generated reality (CGR) object may be brightened to a lighter grey CGR because the superposition characteristic values indicate that the physical environment has a low luminance value. Without brightening the dark grey CGR object, the high luminance value would result in a relatively low contrast level between the dark grey CGR object and a portion of the physical environment proximate to the dark grey CGR object, resulting in poor user visibility of the dark grey CGR object. In another example, a rendered dark grey computer-generated reality (CGR) object may be brightened to a lighter grey CGR because the superposition characteristic values indicate that the physical environment has varying patterns of light and dark luminance values, which would reduce noticeability of the dark gray CGR object.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a see-through display through which a person may directly view the physical environment. The system may be configured to present virtual objects on the see-through display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. As an example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the Sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a display. The see-through display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the see-through display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, an inertial measurement unit (IMU) 130, image sensor(s) 143 (e.g., a camera), a depth sensor 150, eye tracking sensor(s) 164 (e.g., included within a head-mountable device (HMD)), an ambient light sensor 190, and other input or control device(s) 116. In some implementations, the electronic device 100 corresponds to one of a mobile phone, tablet, laptop, wearable computing device, head-mountable device (HMD), head-mountable enclosure (e.g. the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more CPUs 120, and the memory controller 122 are, optionally, implemented on a single chip, such as a chip 103. In some other implementations, they are, optionally, implemented on separate chips.

The I/O subsystem 106 couples input/output peripherals on the electronic device 100 and the other input or control devices 116 with the peripherals interface 118. The I/O subsystem 106 optionally includes an image sensor controller 158, an eye tracking controller 162, and one or more input controllers 160 for other input or control devices, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of a speaker and/or audio sensor(s). The one or more buttons optionally include a push button. In some implementations, the other input or control devices 116 includes a positional system (e.g., GPS) that obtains information concerning the location and/or orientation of the electronic device 100 relative to a physical environment.

The I/O subsystem 106 optionally includes a speaker and audio sensor(s) that provide an audio interface between a user and the electronic device 100. Audio circuitry receives audio data from the peripherals interface 118, converts the audio data to an electrical signal, and transmits the electrical signal to the speaker. The speaker converts the electrical signal to human-audible sound waves. Audio circuitry also receives electrical signals converted by an audio sensor (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The I/O subsystem 106 optionally includes a touch-sensitive display system that provides an input interface and an output interface between the electronic device 100 and a user. A display controller may receive and/or send electrical signals from/to the touch-sensitive display system. The touch-sensitive display system displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system has a touch-sensitive surface, sensor, or set of sensors that accepts input from the user based on haptic and/or tactile contact. The touch-sensitive display system and the display controller (along with any associated modules and/or sets of instructions in the memory 102) detect contact (and any movement or breaking of the contact) on the touch-sensitive display system and converts the detected contact into interaction with user-interface objects (e.g., one or more soft keys, icons, web pages or images) that are displayed on the touch-sensitive display system. In an example implementation, a point of contact between the touch-sensitive display system and the user corresponds to a finger of the user or a stylus.

The touch-sensitive display system optionally uses LCD (liquid crystal display) technology, LPD (light emitting polymer display) technology, or LED (light emitting diode) technology, although other display technologies are used in other implementations. The touch-sensitive display system and the display controller optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system.

The user optionally makes contact with the touch-sensitive display system using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The I/O subsystem 106 includes the inertial measurement unit (IMU) 130 that may include accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like. The IMU may 130 include accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) 143 corresponds to one or more HMD cameras. In some implementations, the image sensor(s) 143 includes one or more depth sensors. In some implementations, the image sensor(s) 143 includes a monochrome or color camera. In some implementations, the image sensor(s) 143 includes an RGB depth (RGB-D) sensor.

The I/O subsystem 106 optionally includes contact intensity sensors that detect intensity of contacts on the electronic device 100 (e.g., a touch input on a touch-sensitive surface of the electronic device 100). The contact intensity sensors may be coupled with an intensity sensor controller in the I/O subsystem 106. The contact intensity sensor(s) optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) receive contact intensity information (e.g., pressure information or a proxy for pressure information) from the physical environment. In some implementations, at least one contact intensity sensor is collocated with, or proximate to, a touch-sensitive surface of the electronic device 100. In some implementations, at least one contact intensity sensor is located on the back of the electronic device 100.

In some implementations, the depth sensor 150 is configured to obtain depth data, such as depth information characterizing an object within an obtained input image. For example, the depth sensor 150 corresponds to one of a structured light device, a time-of-flight device, and/or the like.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The ambient light sensor (ALS) 190 detects ambient light from the physical environment. In some implementations, the ambient light sensor 190 is a color light sensor. In some implementations, the ambient light sensor 190 is a two-dimensional (2D) or a three-dimensional (3D) light sensor.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2B:
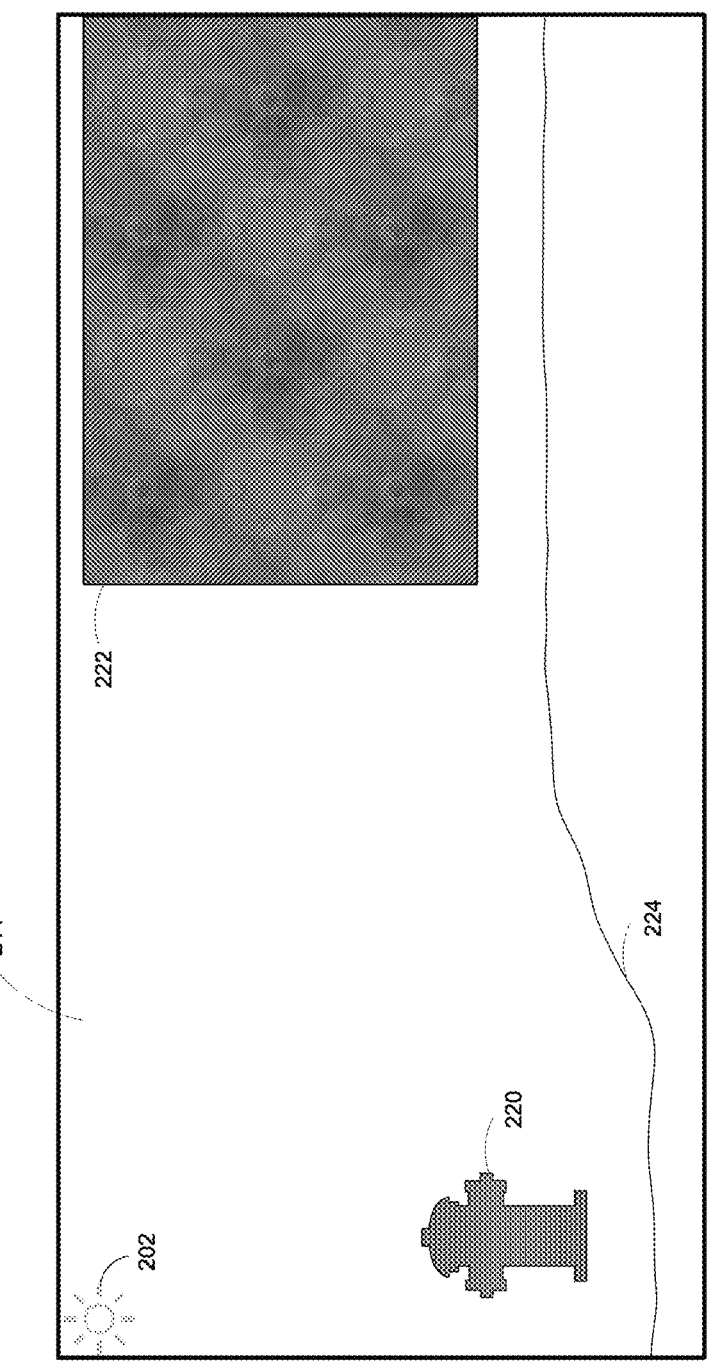

FIGS. 2A-2G are an example of light from a physical environment 200 interfering with display of an object. As illustrated in FIG. 2A, the physical environment 200 includes a user 210 wearing an electronic device 212 (e.g., a head-mountable display (HMD)) that includes a see-through display 214. The see-through display 214 is associated with a field-of-view 216 that includes the Sun 202, a red fire hydrant 220, a blue wall 222, and a path 224. In other words, when the user 210 looks through the see-through display 214, the user 210 sees the Sun 202, the red fire hydrant 220, the blue wall 222, and the path 224. The red fire hydrant 220 and the blue wall 222 include different patterns (e.g., the red fire hydrant 220 includes a horizontal-line pattern whereas the blue wall 222 includes a cross-hatch pattern) in order to indicate that they are different colors. FIG. 2B illustrates the see-through display 214 including the aforementioned physical objects within the physical environment 200.

Figure 2C:
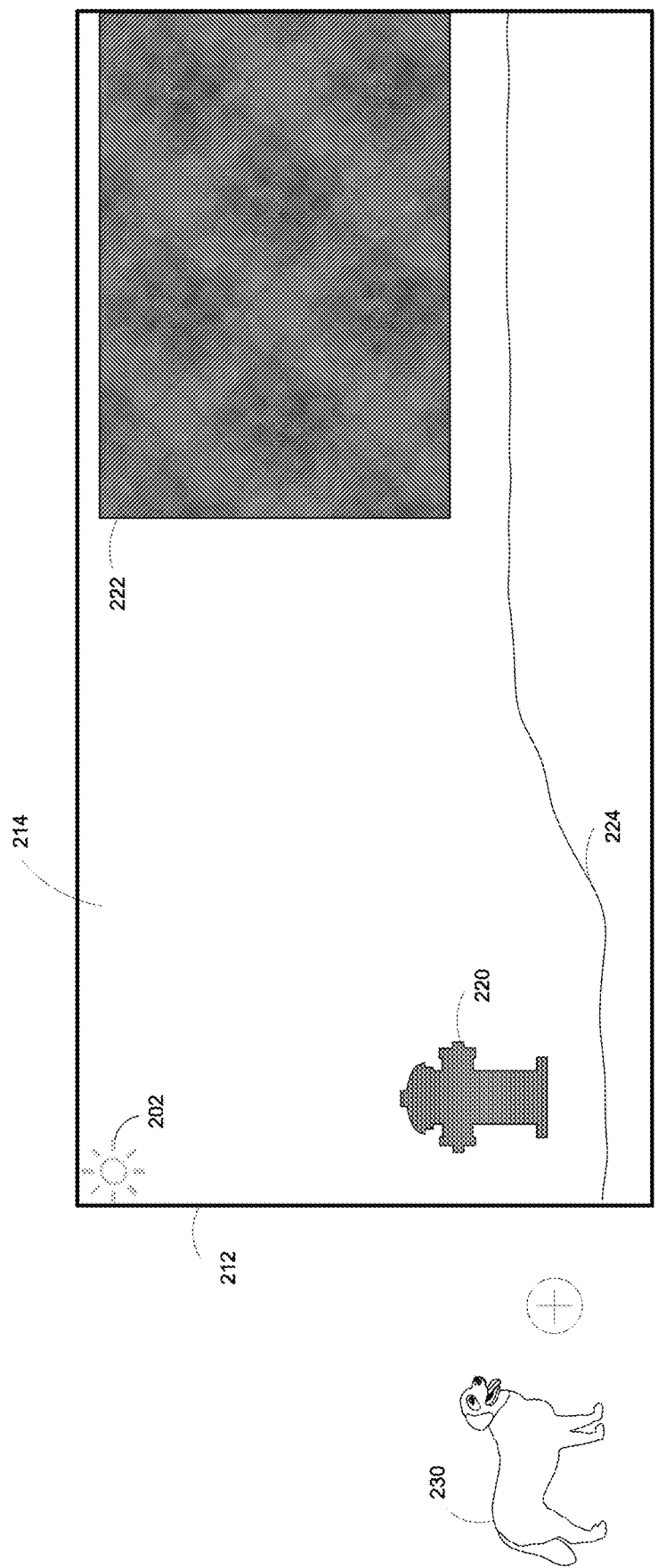

As illustrated in FIG. 2C, the electronic device 212 is adding a CGR dog 230 to the see-through display 214, as indicated by the plus sign, which is illustrated for purely illustrative purposes. The CGR dog 230 is white in color. In other words, the electronic device 212 renders the CGR dog 230 as white and thus the preferred display color of the CGR dog 230 once added to the see-through display 214 is likewise white.

Figure 2D:
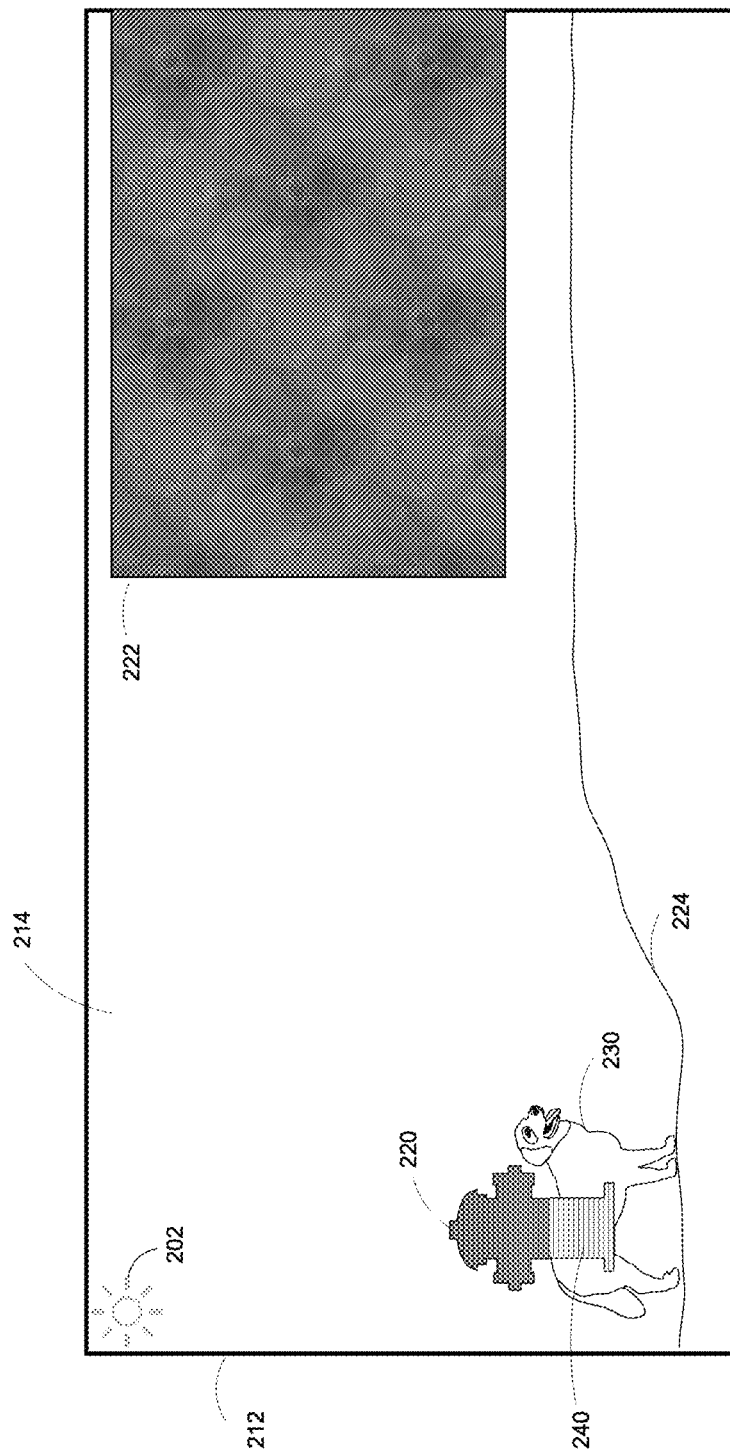

As illustrated in FIG. 2D, the electronic device 212 adds the CGR dog 230 to the see-through display 214. Namely, the CGR dog 230 is added to (e.g., overlaid on) a portion of the see-through display 214 that includes the red fire hydrant 220. However, as illustrated in FIG. 2D, the light reflecting off of the red fire hydrant 220 interferes with display of the CGR dog 230. Namely, the red fire hydrant 220 overlaps with a first portion 240 of the CGR dog 230. Accordingly, the red color of the red fire hydrant 220 mixes with the white color of the first portion 240 of the CGR dog 230, causing the first portion 240 of the CGR dog 230 to be pink in color rather than the preferred white color of the rest of the CGR dog 230.

Figure 2E:
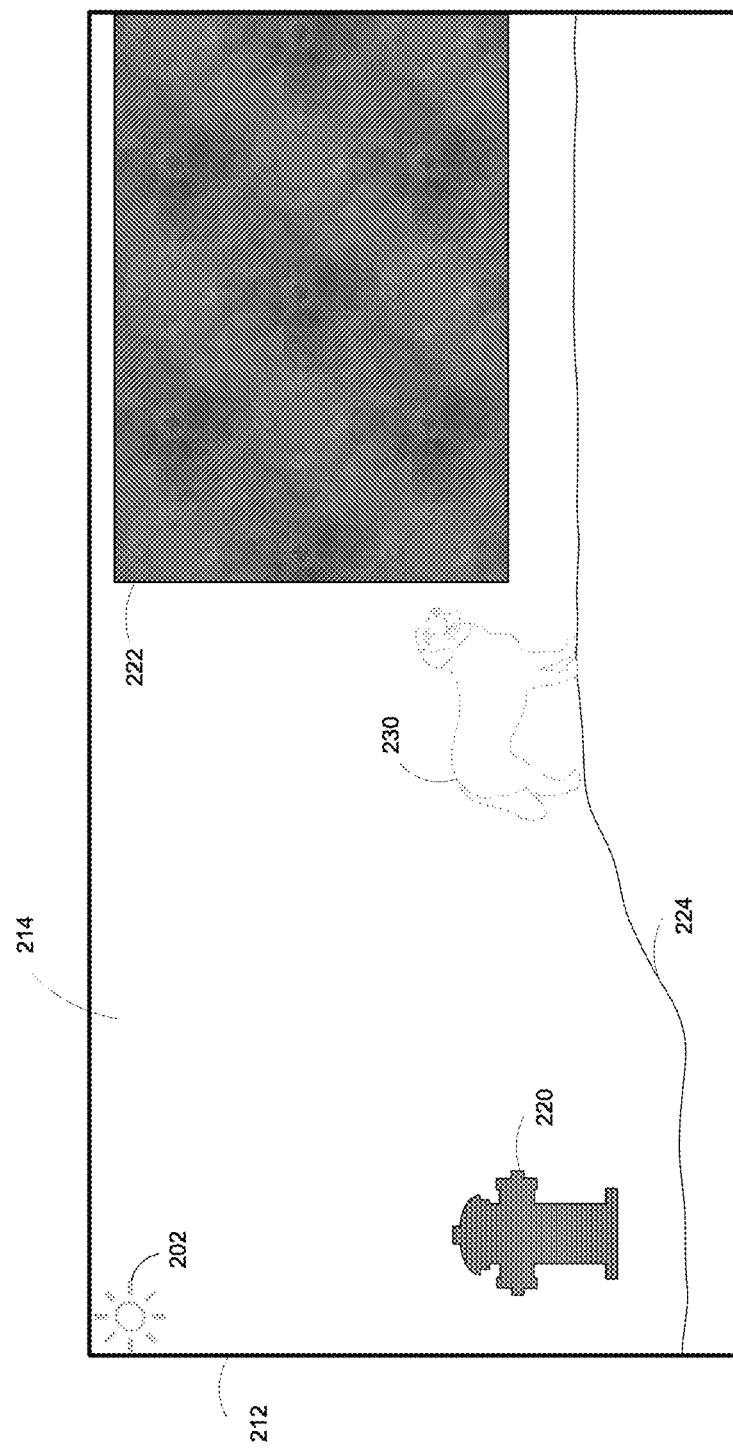

As illustrated in FIG. 2E, the electronic device 212 has moved the CGR dog 230 along the path 224 towards the blue wall 222. The light emanating from the Sun 202 is more intense (e.g., more luminate) than lighting features of the CGR dog 230. Accordingly, the Sun 202 drowns out the lighting features of the CGR dog 230, resulting in a low brightness contrast between the Sun 202 and the CGR dog 230, which, in turn, results in a faded CGR dog 230 in FIG. 2E.

Figure 2F:
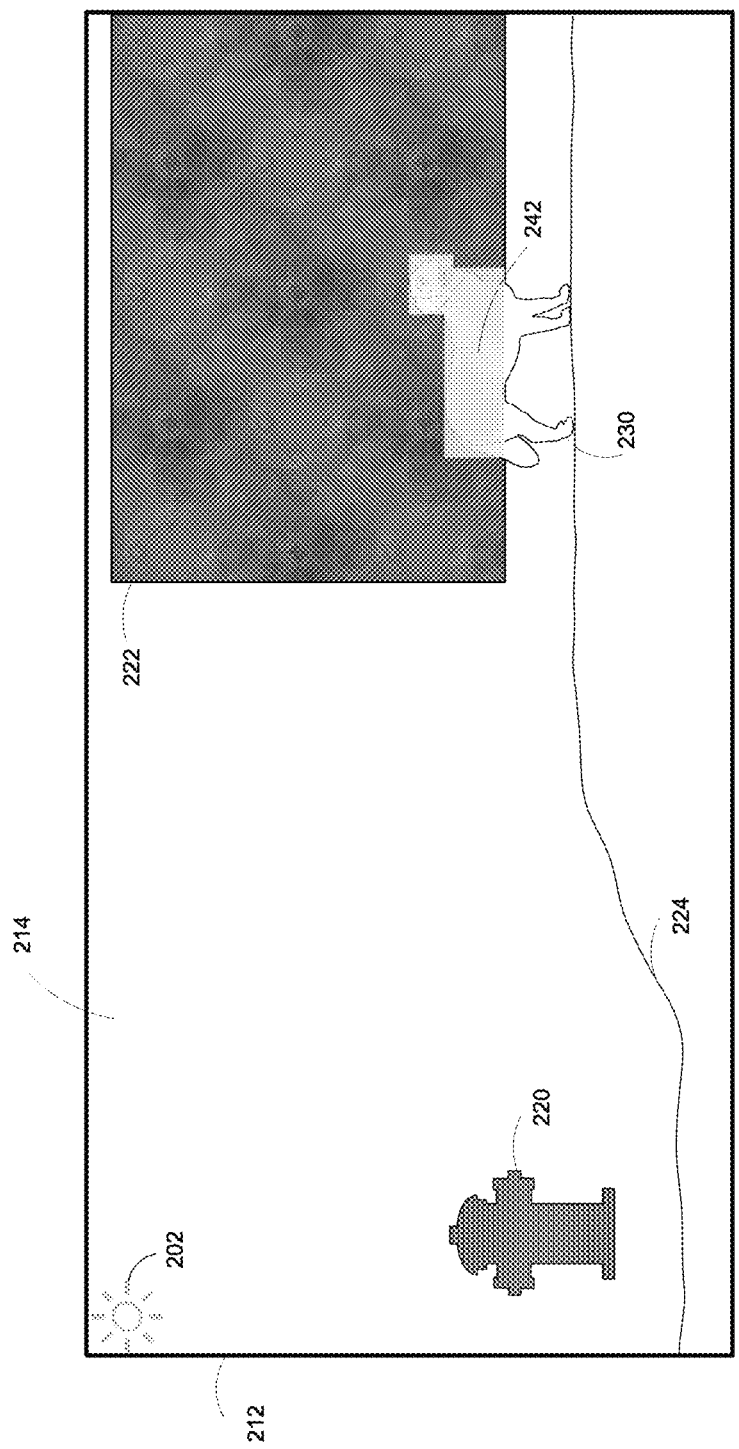

As illustrated in FIG. 2F, the electronic device 212 has moved the CGR dog 230 to a portion of the see-through display 214 that includes the blue wall 222. However, as illustrated in FIG. 2F, the light reflecting off of the blue wall 222 interferes with display of the CGR dog 230. Namely, the blue wall 222 overlaps with a second portion 242 of the CGR dog 230, as indicated by a lighter cross-hatch pattern within the second portion 242 (as compared with the cross-hatch pattern of the blue wall 222). Accordingly, the blue color of the blue wall 222 mixes with the white color of the second portion 242 of the CGR dog 230, causing the second portion 242 of the CGR dog 230 to be light blue rather than the preferred white color of the remainder of the CGR dog 230.

Figure 2G:
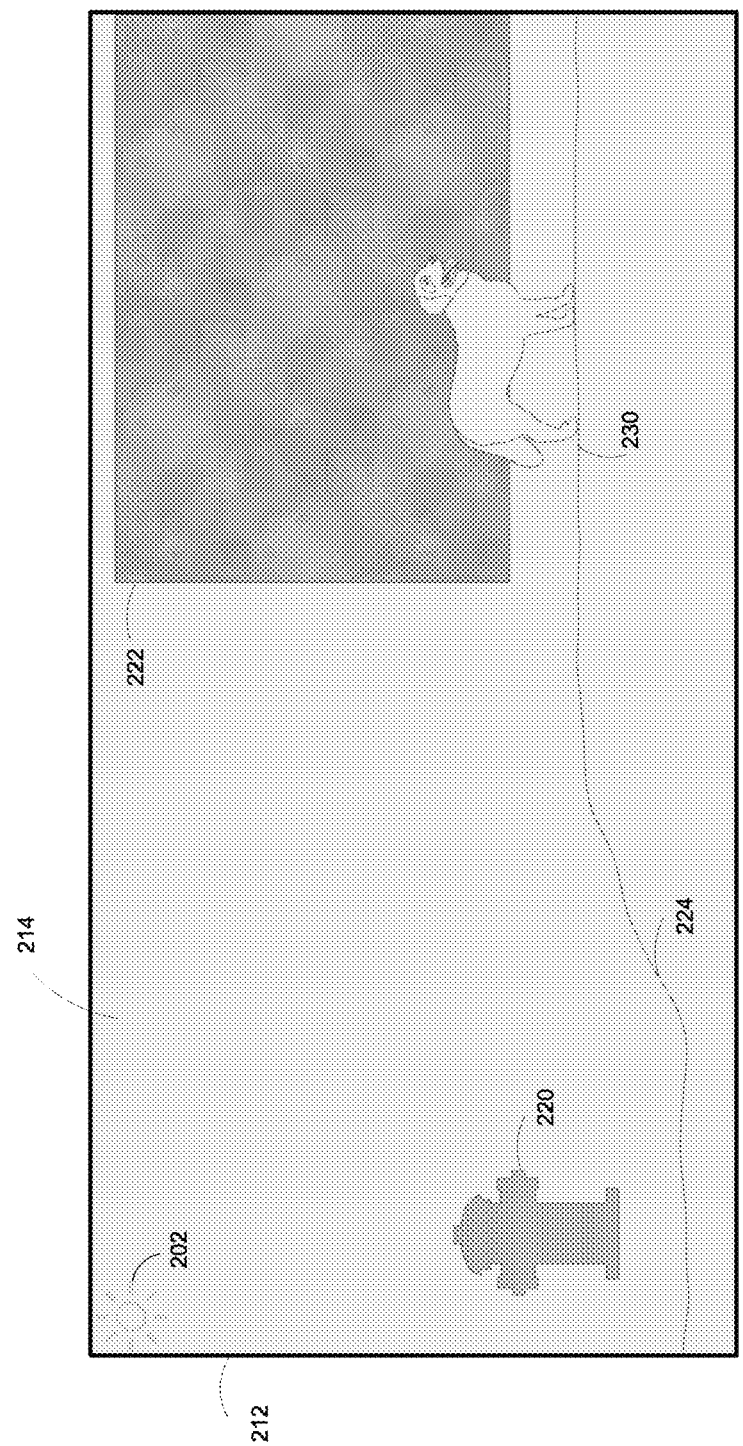

As illustrated in FIG. 2G, in some circumstances, the electronic device 212 provides (e.g., overlays) a physical fixed dimming layer onto the see-through display 214 in order to block a certain amount light from passing through to the see-through display 214 from the physical environment 200. However, this mechanism is problematic because, as a result, the see-through display 214 displays a constantly darker version of the physical environment 200, thereby degrading the user's experience, and preventing use of such systems in low light situations.

Figure 3A:
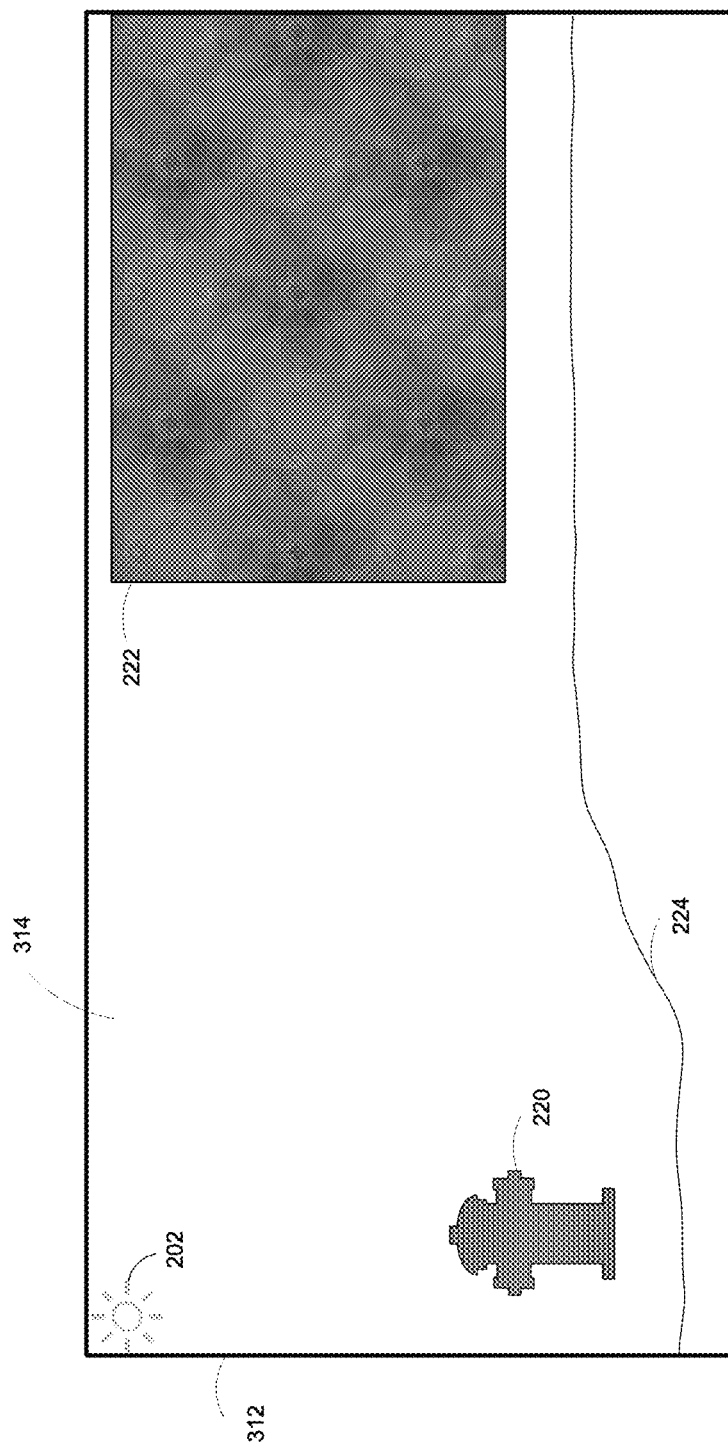
FIGS. 3A-3C are an example of an electronic device modifying rendered image data based on light superposition characteristic values associated with ambient light from a physical environment in accordance with some implementations.
Figure 3B:
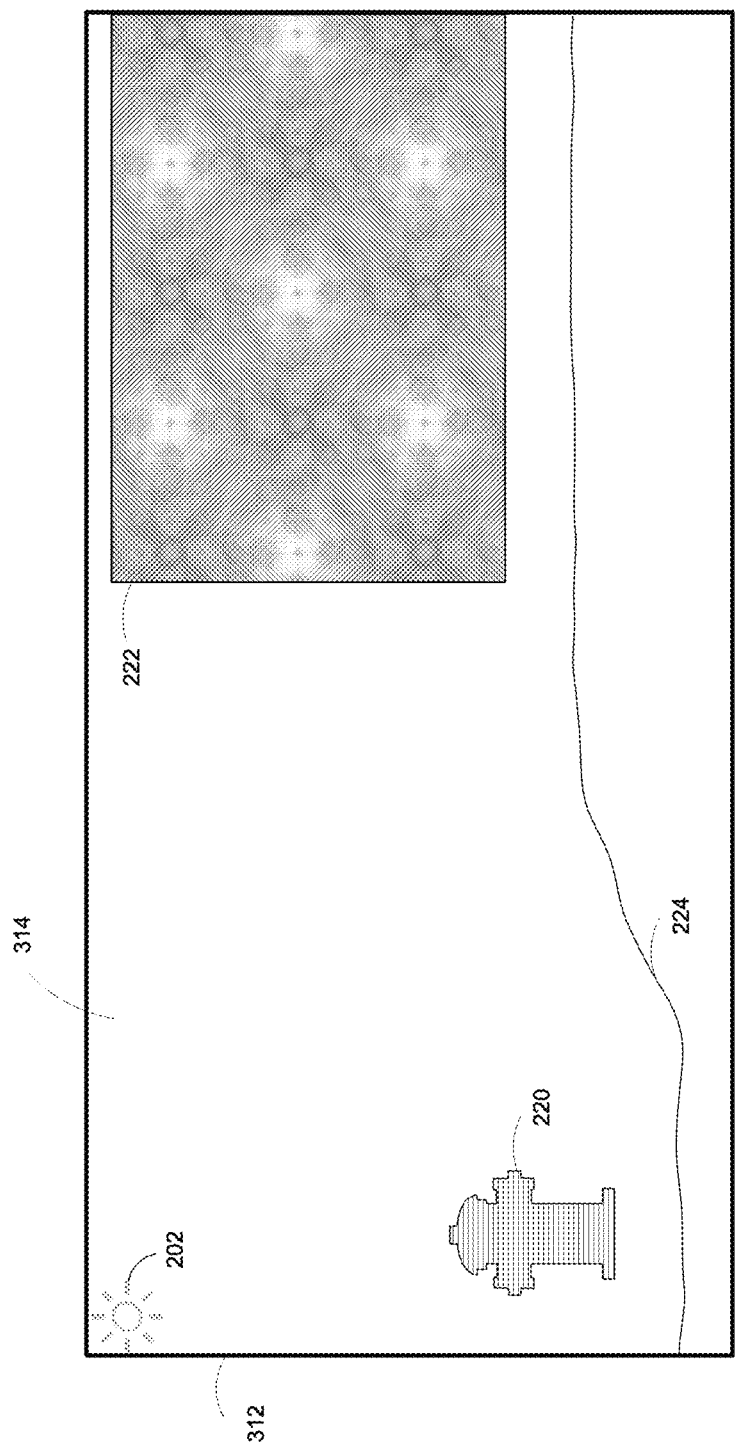
Figure 3C:
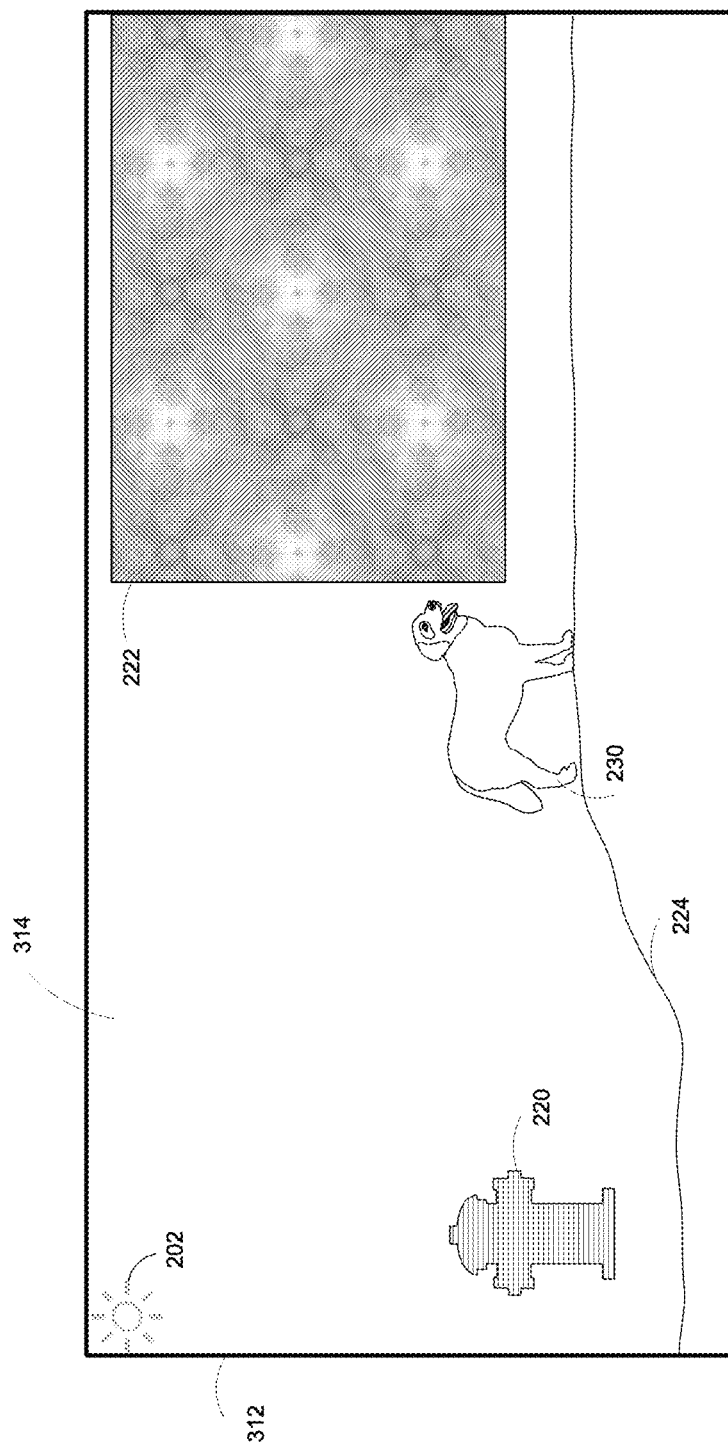

FIGS. 3A-3C are an example of an electronic device 312 modifying rendered image data based on light superposition characteristic values associated with ambient light from a physical environment in accordance with some implementations. In some implementations, the electronic device 312 corresponds to a mobile device, such as a smartphone, tablet, media player, laptop, etc. In some implementations, the electronic device 312 corresponds to a head-mountable device (HMD) that includes an integrated display (e.g., a built-in display). In some implementations, the HMD includes a head-mountable enclosure. In various implementations, the head-mountable enclosure includes an attachment region to which another device with a see-through display can be attached. In various implementations, the head-mountable enclosure is shaped to form a receptacle for receiving another device that includes a see-through display 314. For example, in some implementations, the electronic device 312 slides/snaps into or otherwise attaches to the head-mountable enclosure. In some implementations, the see-through display 314 of the device attached to the head-mountable enclosure presents (e.g., displays) the plurality of sequential images. For example, in some implementations, the electronic device 312 corresponds to a mobile phone that can be attached to the head-mountable enclosure.

In some implementations, the electronic device 312 corresponds to an HMD that operates as an additive display by adding CGR to the light from the user's physical environment. For example, in some implementations, the HMD operates as an additive display by projecting CGR content to be reflected off of the see-through display 314. As another example, in some implementations, the HMD operates as an additive display by displaying CGR content onto an emissive display to the user's eyes. As yet another example, in some implementations, the HMD operates as an additive display by emitting light towards the see-through display 314, such as via a waveguide. As yet another example, in some implementations, the HMD operates as an additive display by projecting CGR content directly at the user's retinas, where pass-through light from the physical environment and the projected light of the CGR content concurrently reach the retinas.

In some implementations, the see-through display 314 corresponds to a translucent display. In some implementations, the see-through display 314 corresponds to glasses with optical see-through. In some implementations, the see-through display 314 is made of a see-through material (e.g., glass or plastic). In some implementations, the see-through display 314 corresponds to an additive display that enables optical see-through of the physical environment, such as an optical HMD (OHMD). For example, in contrast to pure compositing using a video stream, the additive display is capable of reflecting projected images off of the display while enabling the user to see through the display. In some implementations, the see-through display 314 displays at least a nominal amount of light from the physical environment. In some implementations, the see-through display 314 includes a photochromic lens or an electrochromic layer.

As illustrated in FIG. 3A, the electronic device 312 displays, via the see-through display 314, a rendered image that includes the Sun 202, the red fire hydrant 220, the path 224, and the blue wall 222, which were discussed above with reference to FIGS. 2A-2G. In order to improve the lack of contrast between the CGR dog 230 and light emanating from the Sun 202 illustrated in FIG. 2E, the electronic device 312 globally tints the see-through display 314 in some implementations. Accordingly, as illustrated in FIG. 3B, the see-through display 314 includes the red fire hydrant 220 with a lighter red hue (as indicated by a lighter shade of the horizontal pattern) and the blue wall 222 with a lighter blue hue (as indicated by a lighter shade of the cross-hatch pattern) as compared with the corresponding physical objects in FIG. 2B. As a result of the tinting, as illustrated in FIG. 3C, the CGR dog 230 and the light emanating from the Sun 202 have a greater amount of contrast with respect to each other, and thus the CGR dog 230 is more visible (e.g., less faded out) as compared with the CGR dog 230 in FIG. 2E. As another example, in some implementations, instead of or in addition to tinting the see-through display 314, the electronic device 312 increases the luminance value of the CGR dog 230 in order to establish an adequate level of contrast between the CGR dog 230 and the light emanating from the Sun 202. For example, the electronic device 312 renders the CGR dog 230 with a higher luminance white than it otherwise would in order to compensate for the brightness of the Sun 202.

FIGS. 4A-4D are another example of are an example of an electronic device 412 modifying rendered image data based on light superposition characteristic values associated with ambient light from a physical environment in accordance with some implementations. According to various implementations, the electronic device 412 is similar to the electronic device 312 described above with reference to FIGS. 3A-3C. The electronic device 412 includes a see-through display 414. According to various implementations, the see-through display 414 is similar to the see-through display 314 described above with reference to FIGS. 3A-3C.

Figure 4A:
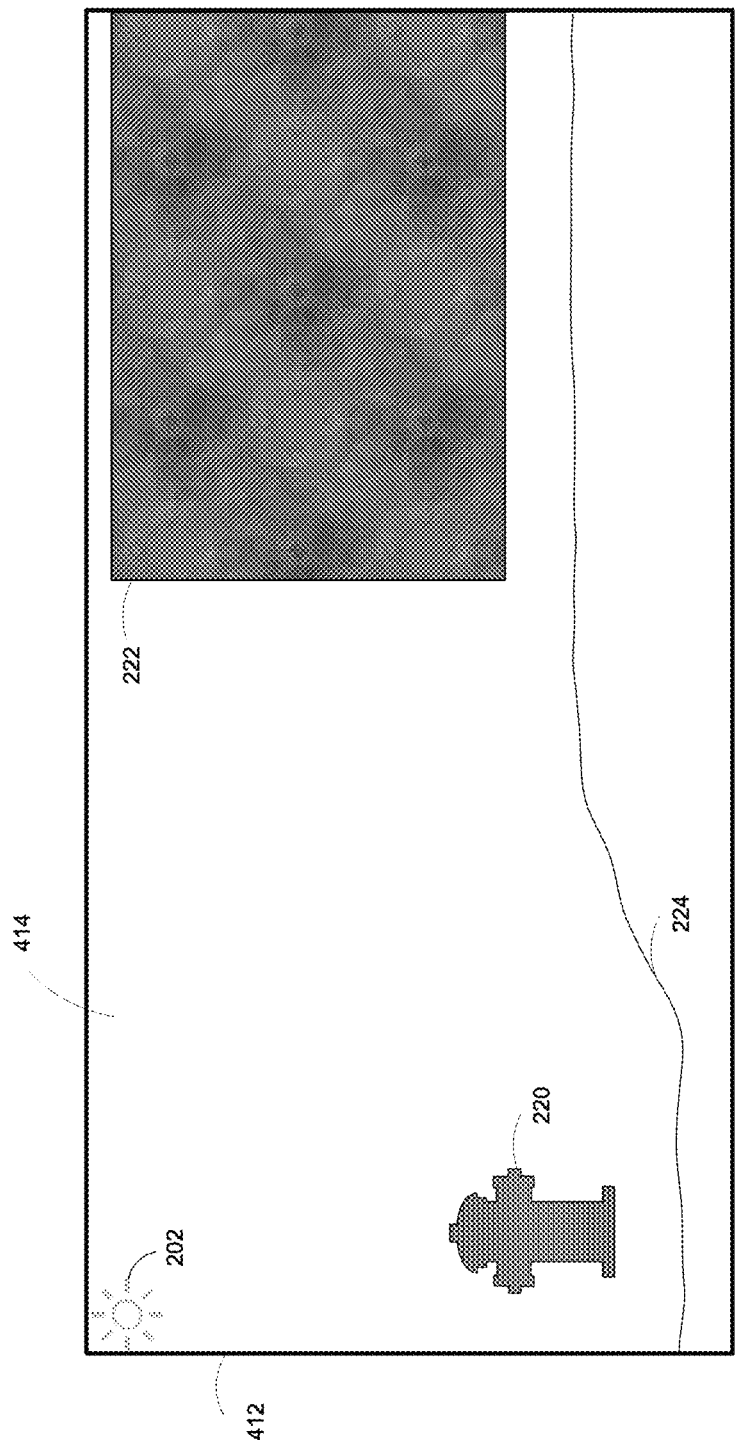
FIGS. 4A-4D are another example of an electronic device modifying rendered image data based on light superposition characteristic values associated with ambient light from a physical environment in accordance with some implementations.
Figure 4B:
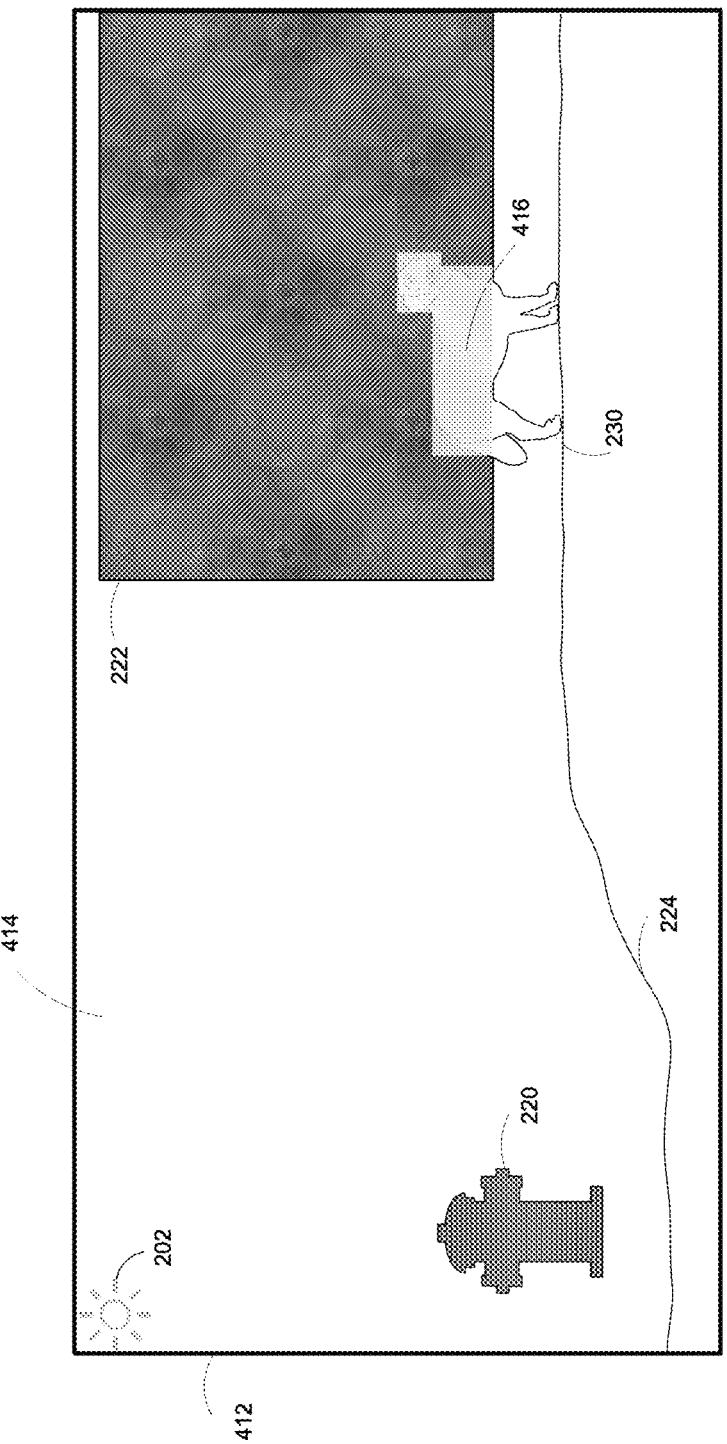

As illustrated in FIG. 4A, the electronic device 412 displays, via the see-through display 414, a rendered image that includes the Sun 202, the red fire hydrant 220, the path 224, and the blue wall 222. As illustrated in FIG. 4B, the electronic device 414 adds the CGR dog 230 to a portion 416 of the see-through display 414 and in front of a corresponding portion of the blue wall 222. As a result, the blue light reflecting off of the blue wall 222 undesirably mixes with the CGR dog 230. Accordingly, a portion of the CGR dog 230 is distorted by the blue light. In order to reduce the undesirable color mixing between the blue wall 222 and the CGR dog 230, the electronic device 412 modifies the rendered image. In some implementations, the electronic device 412 modifies the rendered image before adding the CGR dog 230 to the see-through display 414.

Figure 4C:
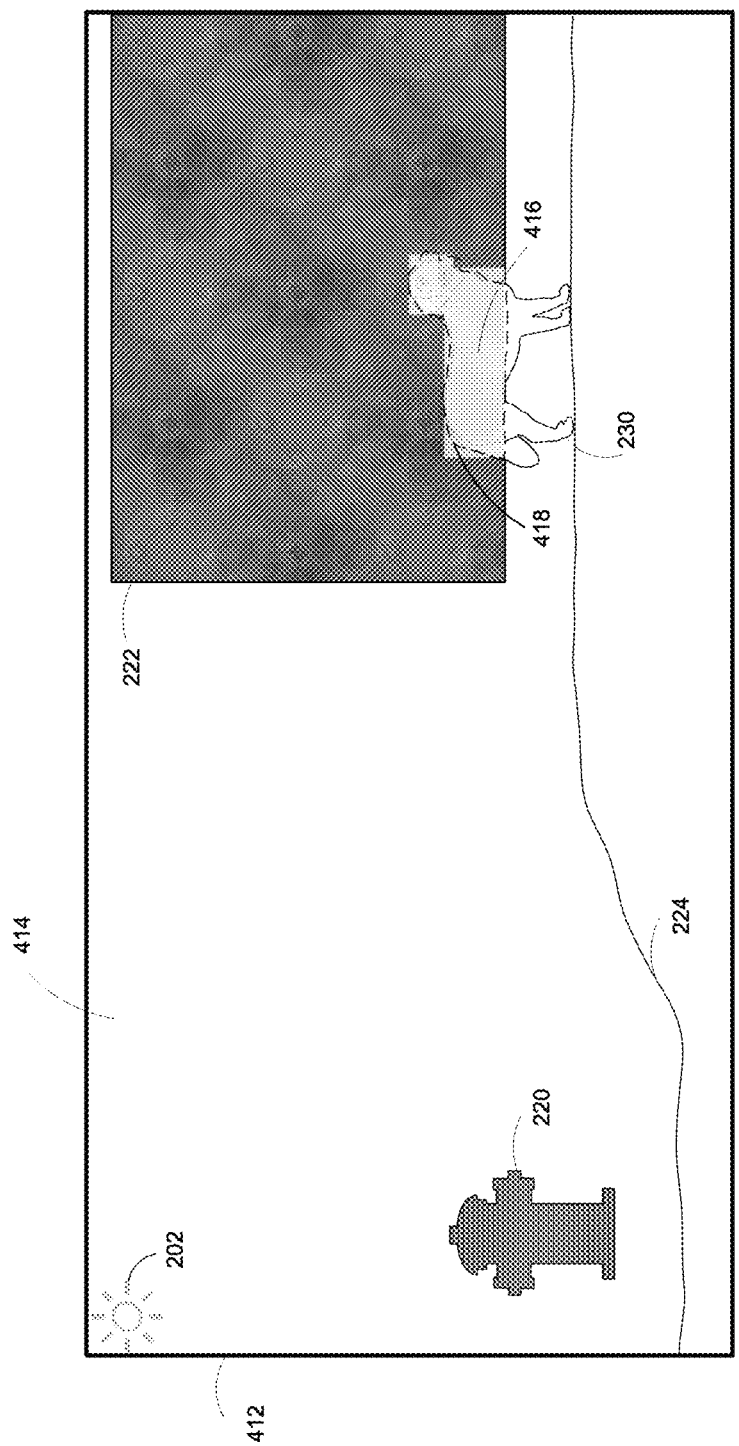
Figure 4D:
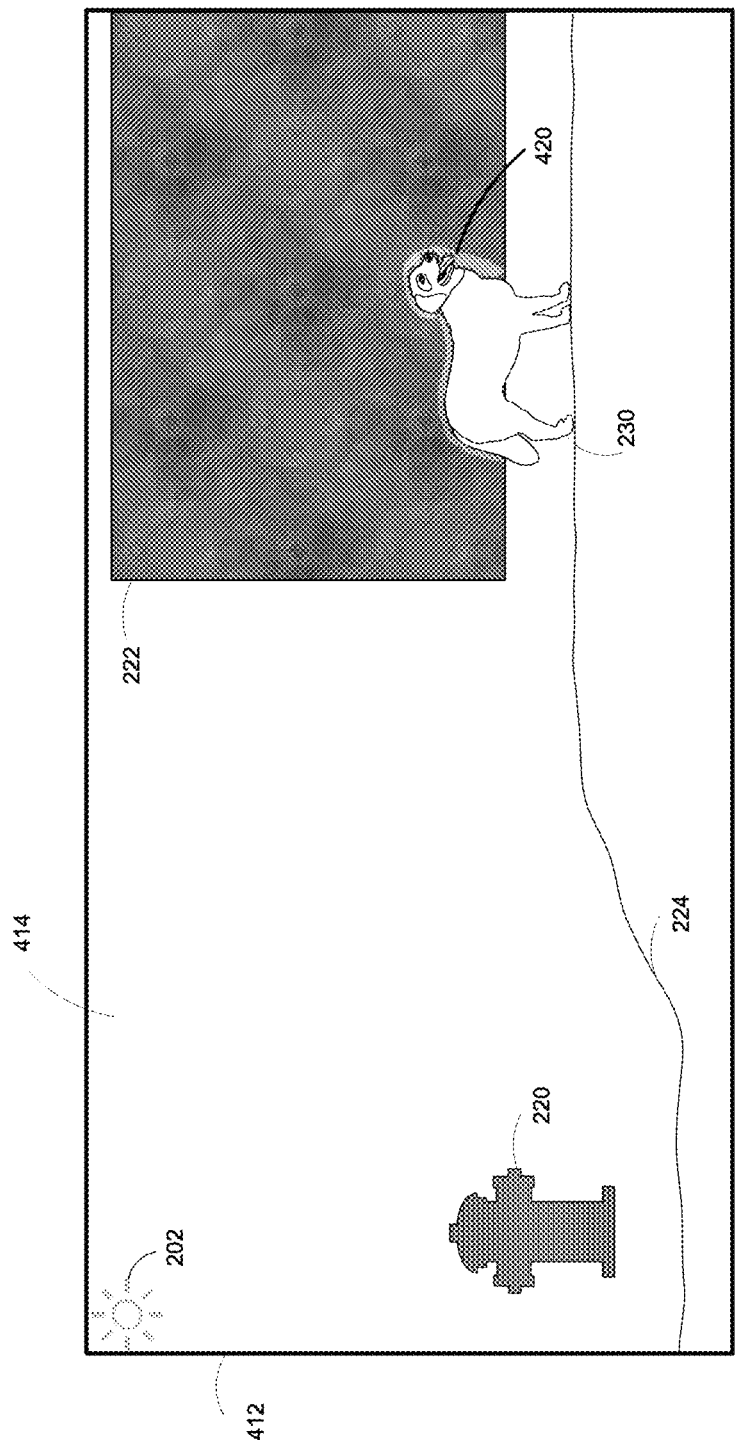

To that end, as illustrated in FIG. 4C, the electronic device 312 identifies an area 418 of the see-through display 414 on which to modify the rendered image. For example, in some implementations, the electronic device 412 modifies color compositions of respective portions of the CGR dog 230 and/or the blue wall 222. As one example, before adding the CGR dog 230 to the see-through display 414, the electronic device 412 renders a portion of the CGR dog 230, that corresponds to the area 418, with a color that is opposite (e.g., other side of the color spectrum) to the blue color of the blue wall 222. Thus, once the electronic device 412 adds the CGR dog 230 to the see-through display 414, the CGR dog 230 appears to be the desired white color, as illustrated in FIG. 4D. Note that in FIG. 4D an artifact 420 may appear resulting from the modified rendering of the CGR dog 230. As another example, in some implementations, instead of or in addition to modifying color compositions, the electronic device 412 tints the area 418 (e.g., performs local tinting), such as reducing the luminance of the portion of the blue wall 222 corresponding to the area 418. Accordingly, as illustrated in FIG. 4D, the CGR dog 230 added to the see-through display 414 appears to be desired white color because the magnitude of the blue light reflecting off of the blue wall 222 is reduced.

Figure 5:
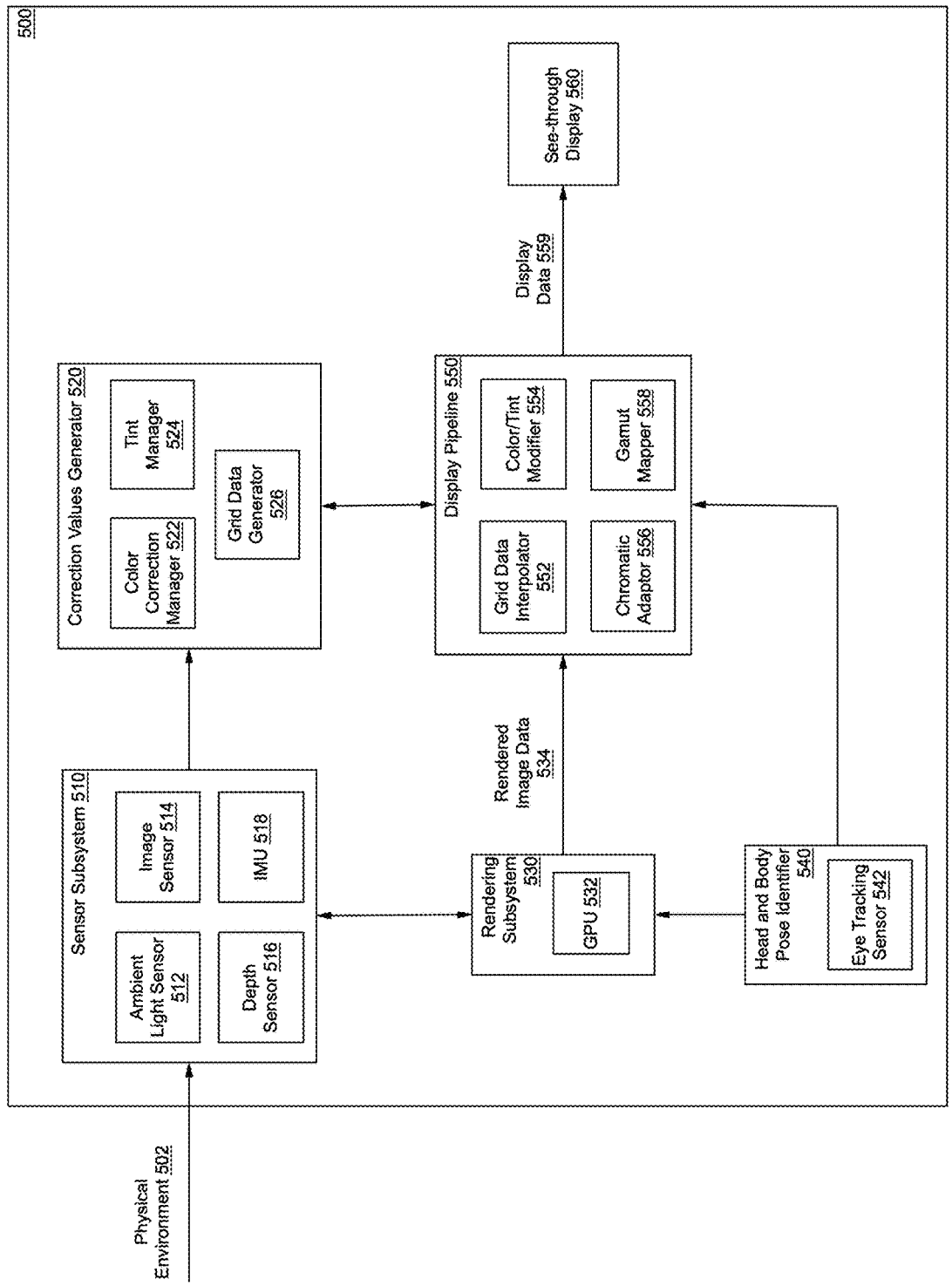
FIG. 5 is an example of a block diagram of a system for modifying rendered image data based on light superposition characteristic values associated with ambient light from a physical environment in accordance with some implementations.

FIG. 5 is an example of a block diagram of a system 500 for modifying rendered image data 534 based on light superposition characteristic values associated with ambient light from a physical environment 502 in accordance with some implementations. According to various implementations, the system 500, or components thereof, is similar to and adapted from corresponding components of the electronic device 100 illustrated in FIG. 1. According to various implementations, the system 500 is similar to and adapted from the electronic device 312 described with reference to FIGS. 3A-3C or the electronic device 412 described with reference to FIGS. 4A-4D. In various implementations, the system 500 or components thereof are performed by a head-mountable device (HMD) including a see-through display 560.

In some implementations, the system 500 includes a sensor subsystem 510 to sense a plurality of light superposition characteristic values associated with ambient light from the physical environment 502. The plurality of light superposition characteristic values quantifies the ambient light arriving at the see-through display 560. In some implementations, the sensor subsystem 510 includes a combination of sensors, such as an ambient light sensor (ALS) 512 (e.g., a two-dimensional (2D) sensor), an image sensor 514, a depth sensor 516 (e.g., a time of flight sensor), and an inertial measurement unit (IMU) 518. For example, in some implementations, the sensor subsystem 510 includes a monochrome or color camera with a depth sensor (RGB-D) and determines camera pose to point-of-view projection based on data from the RGB-D. As another example, in some implementations, the sensor subsystem 510 captures a lower resolution scene image, such as via a dedicated low-resolution image sensor or a dedicated high-resolution image sensor. In some implementations, the sensor subsystem 510 is implemented as a hardened IP block. In some implementations, the sensor subsystem 510 is implemented by using software and hardware accelerators.

In some implementations, sensing the plurality of light superposition characteristic values includes determining scene content information associated with the physical environment 502. For example, in some implementations, the sensor subsystem 510 includes a pose-dependent adaptive monochrome or color camera that obtains scene content information associated with the physical environment 502. As another example, in some implementations, the sensor subsystem 510 determines the scene content information via a reuse of world mesh pipeline (e.g., scene reconstruction) where scene texture/color and geometry information are obtained from a rendering subsystem 530 and projected to an eye space of an HMD.

According to various implementations, the sensor subsystem 510 provides respective output data of currently utilized sensors to the rendering subsystem 530, which, in turn, generates the rendered image data 534. The rendered image data 534 includes a representation of a computer-generated reality (CGR) object for display using the see-through display 560. In some implementations, the rendering subsystem 530 includes a graphics processing unit (GPU) 532 that generates the rendered image data 534. The rendering subsystem 530 provides the rendered image data 534 to a display pipeline 550 of the system 500.

In some implementations, the system 500 includes a head and body pose identifier 540 that obtains, for example, eye tracking data of a user via an eye tracking sensor 542. The head and body pose identifier 540 may provide head and body pose data to the rendering subsystem 530. Accordingly, the rendering subsystem 530 may utilize head and body pose information of a user in generating rendered image data. For example, the rendering subsystem 530 may perform foveated rendering in order to render portions of image data that are within an eye focus area at a higher resolution than portions of the image data that are outside of the eye focus area (e.g., in the user's peripheral vision). In some implementations, the head and body pose identifier 540 provides the head and body pose data to the display pipeline 550, the utilization of which will be described below.

According to various implementations, the sensor subsystem 510 provides the plurality of light superposition characteristic values to a corrections value generator 520. The corrections value generator 520 determines a plurality of display correction values associated with the electronic device based on the plurality of light superposition characteristic values and predetermined display characteristics of the representation of the object (e.g., CGR object). The corrections value generator 520 provides the plurality of display correction values to the display pipeline 550, which, in turn, generates display data 559 for the see-through display 560. Generation of the display data 559 is described below. As illustrated in FIG. 5, the corrections value generator 520 is decoupled from the display pipeline 550.

In some implementations, the corrections value generator 520 includes a color correction manager 522 that determines a color composition correction value based on the plurality of light superposition characteristic values and the predetermined display characteristics of the representation of the object. For example, the color composition correction value indicates a combination of a hue value and a saturation value associated with the physical environment 502. As another example, the color composition correction value indicates a chromaticity value associated with the physical environment 502.

In some implementations, the corrections value generator 520 includes a tint manager 524 that determines a tint value based on the plurality of light superposition characteristic values and the predetermined display characteristics of the representation of the object. For example, the tint value indicates a luminance (e.g., brightness) value associated with the physical environment 502. As yet another example, the tint value indicates a contrast level between the predetermined display characteristics of the representation of the object and a portion of the physical environment 502 in which the object is to be displayed.

According to various implementations, the corrections value generator 520 determines the plurality of display correction values as a function of a respective output of the color correction manager 522 and a respective output of the tint manager 524. For example, in some implementations, the plurality of display correction values includes a combination of global luminance values associated with the physical environment 502 and chromaticity values associated with the physical environment 502. As another example, in some implementations, the plurality of display correction values includes a combination of local luminance values associated with the physical environment 502 and chromaticity values associated with the physical environment 502. As yet another example, in some implementations, the plurality of display correction values includes a combination of spatial luminance values associated with the physical environment 502 and chromaticity values associated with the physical environment 502. As yet another example, some implementations, the plurality of display correction values includes a combination of global, local, and spatial luminance values associated with the physical environment 502, but does not include chromaticity values associated with the physical environment 502.

In some implementations, the corrections value generator 520 includes a grid data generator 526 that generates grid data as a function of the plurality of display correction values. For example, the grid data includes a combination of color grid data (e.g., background color) and whitepoint grid data. According to various implementations, the grid data is provided to the display pipeline 550, which interpolates the grid data in order to generate the display data 559. For example, the grid data corresponds to a grid size, and the display pipeline 550 modifies the rendered image data while utilizing processing resources in an amount that is proportional to the grid size. In some implementations, the grid size is a function of the available resources of the system 500, such as access to sensors, resolution levels, expected total registration error, memory availability, processor availability, system power state, etc. In some implementations, registration error refers to AR registration, which is a metric that measures a relative difference in the perceived location of a virtual point as compared with a point in the physical environment. Registration errors may be highly dependent on system pose tracking latency, binocular or monocular viewing/eye position errors, and reconstruction instrumentation and algorithmic errors. Moreover, the grid size may be a function of scene content, background versus foreground scene content, available power, availability of a secondary device, and/or the like.

According to various implementations, the display pipeline 550 generates, from the rendered image data 534, the display data 559 for the see-through display 560 in accordance with the plurality of display correction values in order to satisfy the predetermined characteristics of the representation of the object within a performance threshold.

To that end, in some implementations, the display pipeline 550 includes a grid data interpolator 552 that determines interpolated grid values by interpolating the grid data from the grid data generator 526. For example, given a grid size of M×N, the grid data interpolator 552 interpolates M×N based on a buffer size or display resolution. Continuing with this example, each pixel in the buffer may be adjusted based on the interpolated grid values.

In some implementations, the display pipeline 550 includes a color and tint modifier 554 that generates the display data 559 by modifying color and/or tint features of the rendered image data 534. According to various implementations, the color and tint modifier 554 modifies color composition features of the rendered image data 534 in accordance with the plurality of display correction values in order to satisfy the predetermined characteristics of the representation of the object within the performance threshold. For example, if the physical environment 502 emits predominately green light and the object is white, the color and tint modifier 554 filters out a portion (e.g., local filtering) of green light emitted onto the see-through display 560 that is located near to where the object is to be displayed. As another example, in some implementations, changing the color composition associated with the see-through display 560 includes adding colors to the see-through display 560 as a function of the ambient light that emanates from the physical environment 502. In some implementations, the color and tint modifier 554 includes multiple color composition filtering layers (e.g., a red filter layer, a green filter layer, and a blue filter layer). The color composition filtering layers may be implemented in hardware or in software. According to various implementations, the color and tint modifier 554 applies the color composition filtering layers to a portion of or the entirety of the see-through display 560 in order to provide the desired filtering.

According to various implementations, the color and tint modifier 554 modifies luminance features of the rendered image data 534 in accordance with the plurality of display correction values in order to satisfy the predetermined characteristics of the representation of the object within the performance threshold. For example, the color and tint modifier 554 changes a tint level by dimming or brightening the see-through display 559. The magnitude of the tint level may be relative to the brightness level of the physical environment 502. In some implementations, the color and tint modifier 554 tints the entirety of the see-through display 560 (e.g., global dimming) or a portion of the see-through display 560 that is less than the entirety of the see-through display 560 (e.g., local dimming). For example, in some implementations, the portion of the see-through display 560 corresponds to a location on the see-through display 560 where the object is to be added. In some implementations, the color and tint modifier 554 includes multiple tinting layers (e.g., 10% opacity, 25% opacity, 75% opacity). The tinting layers may be implemented in hardware or in software. According to various implementations, the color and tint modifier 554 applies the tinting layers to a portion of or the entirety of the see-through display 560 in order to provide the desired tinting.

In some implementations, the display pipeline 550 includes a chromatic adaptor 556. The chromatic adaptor 556 accounts for the ability of a user's visual system to change in order to maintain the appearance of colors of displayed objects, such as the object. In some implementations, the chromatic adaptor 556 emulates color perception of color appearance models. For example, the color appearance model provides perceptual aspects of human color vision, such as the extent to which viewing conditions of a color diverge from the corresponding physical measurement of a stimulus source. In some implementations, the chromatic adaptor 556 utilizes user attributes, such as eye tracking data obtained from the eye tracking sensor 542. For example, the user attributes include a combination of pupil dilation of a user, how long the user has been in the physical environment 502, where the user is located within the physical environment 502, eye gaze (e.g., eye focus) of the user and duration of the eye gaze at a particular location within the physical environment 502, and/or the like.

In some implementations, the display pipeline 550 includes a gamut mapper 558. The gamut mapper 558 operates to map the rendered image data 534 to the display data 559 as a function of attributes of the see-through display 560. For example, the gamut mapper 558 maps the rendered image data 534 to the display data 559 based on a range of colors displayable by the see-through display 560. As another example, the gamut mapper 558 modifies the rendered image data 534 in order to make the display data 559 displayable on the see-through display 560 without introducing an excessive level of distortion, such as by utilizing rendering intents.

In some implementations, the display pipeline 550 utilizes a combination of chromatic adaption, color composition correction, and luminance correction in generating the display data 559. For example, in a pure global luminance values implementation, the display pipeline 550 generates the display data 559 by applying luminance correction curves in a device's native color space or in a device's perceptual color space. As another example, when using both global luminance values and chromaticity values, the display pipeline 550 generates the display data 559 by applying luminance correction curves and a chromatic adaption transform via the chromatic adaptor 556. As yet another example, when using both global luminance values and chromaticity values, the display pipeline 550 generates the display data 559 by applying a four-dimensional (4D) gamut mapping via the gamut mapper 558 and a chromatic adaption transform via the chromatic adaptor 556.

As another example, the display pipeline 550 generates the display data 559 by applying 4D gamut mapping via the gamut mapper 558 and a chromatic adaption transform via the chromatic adaptor 556, as well as a regional (local) based chromatic adaption with spatial temporal smoothing. In some of these implementations, whitepoint and background luminance are determined by an environmental 2D ambient light sensor.

As another example, the display pipeline 550 generates the display data 559 by applying 4D gamut mapping via the gamut mapper 558 and a chromatic adaption transform via the chromatic adaptor 556, as well as a medium to high resolution spatial adaption with temporal and spatial smoothing.

Figure 6:
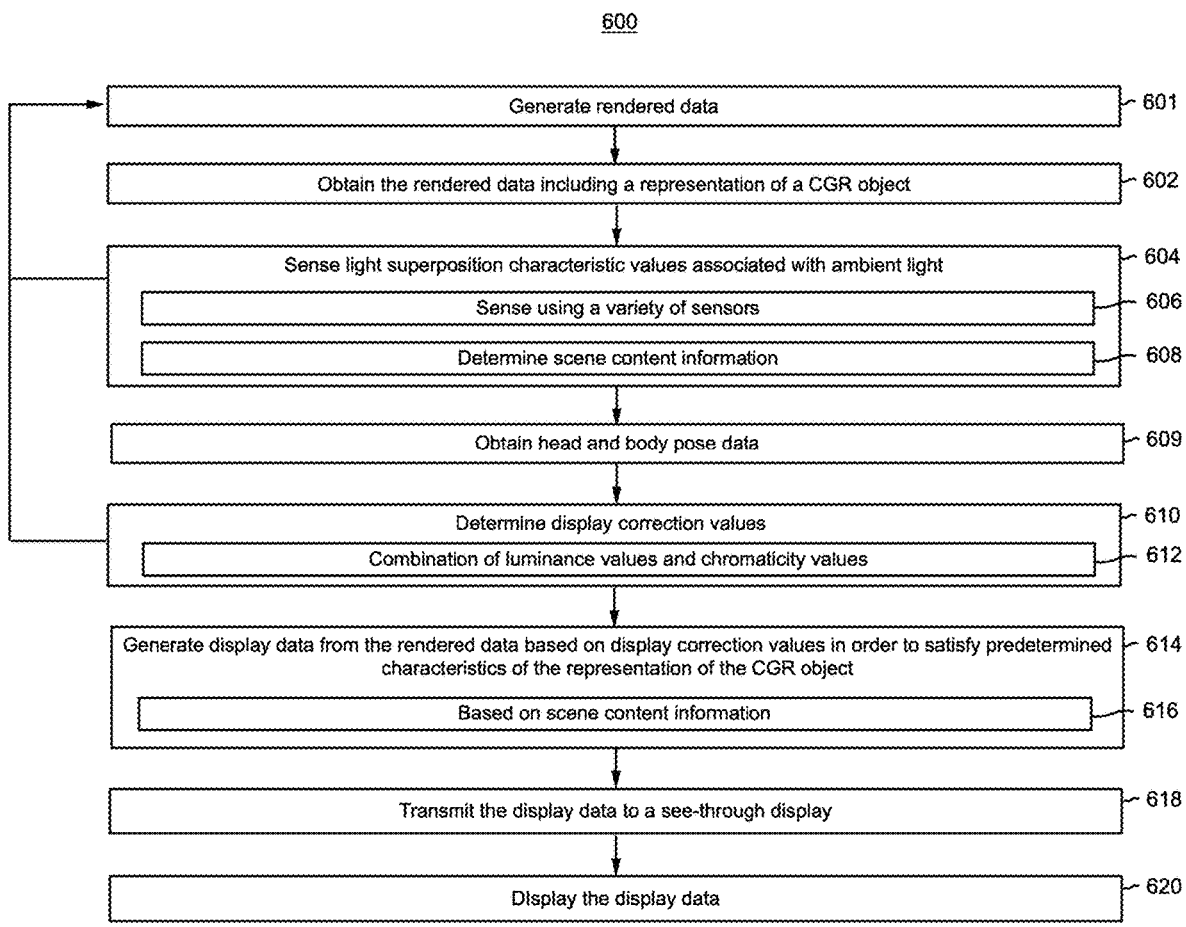
FIG. 6 is an example of a flow diagram of a method of modifying rendered image data based on light superposition characteristic values associated with ambient light from a physical environment in accordance with some implementations.

FIG. 6 is an example of a flow diagram of a method 600 of modifying rendered image data based on light superposition characteristic values associated with ambient light from a physical environment in accordance with some implementations. In various implementations, the method 600 or portions thereof are performed by an electronic device (e.g., the electronic device 100 in FIG. 1, the electronic device 312 in FIGS. 3A-3C, or the electronic device 412 in FIGS. 4A-4D). In various implementations, the method 600 or portions thereof are performed by the system 500. In various implementations, the method 600 or portions thereof are performed by a head-mountable device (HMD) including a see-through display. In some implementations, the method 600 is performed by processing logic, including hardware, firmware, software, or a combination thereof. In some implementations, the method 600 is performed by a processor executing code stored in a non-transitory computer-readable medium (e.g., a memory).

As represented by block 601, in some implementations, the method 600 includes generating rendered image data that includes a representation of an object (e.g., a CGR object). For example, with reference to FIG. 5, the GPU 532 processes image data from the image sensor 514 in order to generate the rendered image data.

As represented by block 602, the method 600 includes obtaining the rendered image data for display using a see-through display. The see-through display permits ambient light through the see-through display. In some circumstances, when displayed, the representation of the object includes a combination of false contours, an incorrect color gamut, an incorrect luminance value, etc. as compared with predetermined (e.g., preferred) display characteristics of the representation of the object. In order to addresses these issues, the method 600 includes modifying the rendered image data by utilizing display correction values that are based on a function of light superposition characteristic values and the predetermined display characteristics, as will be described below. In some implementations, an electronic device obtains the rendered image data from a graphics processing unit (GPU), such as the GPU 532 illustrated in FIG. 5. For example, the rendered image data includes a single rendered image, or a plurality (e.g., a sequence of) rendered images. As another example, the rendered image data corresponds to a rendered video stream.

As represented by block 604, the method 600 includes sensing a plurality of light superposition characteristic values associated with ambient light from the physical environment. The plurality of light superposition characteristic values quantifies the ambient light arriving at the see-through display. For example, the plurality of light superposition characteristic values includes a combination of color (e.g., hue value and saturation value) values of the physical environment, luminance values (e.g., brightness of light) of the physical environment, background versus foreground lighting values, color gamut values, white point values, color contrast values, etc. In some implementations, the ambient light from the physical environment includes light that is reflected off of physical surfaces, such as light that reflects off of a physical table and enters the see-through display.

In some implementations, the method 600 includes utilizing the plurality of light superposition characteristic values in generating subsequently rendered data. For example, when the plurality of light superposition characteristic values indicates a low contrast level between an object and a region of the physical environment that is proximate to the object, the GPU subsequently renders the object at a higher luminance level in order to increase the contrast.

As represented by block 606, in some implementations, the method 600 includes sensing the plurality of light superposition characteristic values by utilizing a variety of sensors. For example, the method 600 includes sensing the plurality of light superposition characteristic values via an image sensor (e.g., a monochrome or color camera) and an ambient light sensor (e.g., a 2D light sensor). As another example, the method 600 includes sensing the plurality of light superposition characteristic values via an image sensor (e.g., the image sensor 514 in FIG. 5) and a depth sensor (e.g., the depth sensor 516 in FIG. 5). In some implementations, an electronic device combines respective sensor data from the variety of sensors using a fixed-function component within the display pipeline, such as at a system-on-chip (SoC) component.

As represented by block 608, in some implementations, sensing the plurality of light superposition characteristic values includes determining scene content information associated with the physical environment. For example, with reference to FIG. 3A, the electronic device 312 determines that the rendered image includes the Sun 202, the red fire hydrant 220, the path 224, and the blue wall 222. According to various implementations, the electronic device sets a grid size for grid data based on the scene content information. Accordingly, the electronic device utilizes less processing resources as compared with an approach that does not account for scene content information in processing image data.

As represented by block 609, in some implementations, the method 600 includes obtaining head and body pose data, such as via the head and body pose identifier 540 described above with reference to FIG. 5. The head and body pose data may provide head and body pose information relative to the physical environment. In some implementations, the head and body pose data indicates current positional information with respect to the head and body pose, such as a head being tilted sideways. In some implementations, the head and body pose data indicates movement information with respect to head and body pose, such as the nodding of a head or the twisting of a torso.

As represented by block 610, the method 600 includes determining a plurality of display correction values associated with the electronic device based on the plurality of light superposition characteristic values and predetermined display characteristics of the representation of the object. For example, the predetermined display characteristics include a predetermined color of the object, such as white for a CGR ghost. As another example, the predetermined display characteristics include a predetermined luminance value of the object, such as relatively high luminance level (e.g., very bright) for a star. In some implementations, the plurality of display correction values is also a function of display characteristics of a see-through display of an electronic device. For example, the display characteristics include lens characteristics, such as a combination of a transparency level of the lens, lens shape and dimensions, lens tint (e.g., frosting) level, distance between the lens and user's eyes, and/or the like. As represented by block 612, in some implementations, the plurality of display correction values includes a combination of luminance values and chromaticity values, such as is described above with reference to the display pipeline 550 illustrated in FIG. 5. In some implementations, the method 600 includes utilizing the plurality of display correction values in generating subsequently rendered data.

In some implementations, the method 600 includes determining the plurality of display correction values as a function of the head and body pose data. For example, when the head and body pose data indicates that a user is turning towards a portion of the physical environment that includes a relatively high luminance level, the method 600 includes proactively dimming a portion of the see-through display that corresponds to the portion of the physical environment.

In some implementations, the plurality of display correction values includes grid data, such as a combination of color grid data (e.g., background color) and whitepoint grid data. For example, with reference to FIG. 5, the method 600 includes determining the grid data at the grid data generator 526 and providing the grid data to the grid data interpolator 552. In some implementations, the grid data interpolator 552 determines interpolated grid values by interpolating the grid data, wherein generating the display data (as will be described below with reference to block 614) includes adjusting the rendered image data according to the interpolated grid values.

As represented by block 614, the method 600 includes generating, from the rendered image data, display data for the see-through display in accordance with the plurality of display correction values in order to satisfy the predetermined display characteristics of the representation of the object within a performance threshold. For example, the performance threshold corresponds to an error threshold. According to various implementations, generating the display data includes performing a combination of edge feathering, contour suppression, color adaption, color warping, and lens warping with respect to the rendered image data. In some implementations, generating the display data from the rendered image data includes modifying a color composition and/or luminance value (e.g., tinting) of the object. For example, in some implementations, the electronic device adds colors to the see-through display as a function of the ambient light that emanates from the physical environment. As an example, if the object is a white ghost and the physical environment includes green trees, the method 600 includes adding additional purple light in order to compensate for the physical green to display the CGR ghost as more neutral white when observed through the see-through display.

As represented by block 616, in some implementations, the display data is generated as a further function of scene content information associated with the rendered image data. For example, if the scene content of the rendered image data includes text, the method 600 includes generating higher-resolution display data than for rendered image data that does not include text in order to aid with readability of the text. To that end, in some implementations, the method 600 includes utilizes semantic segmentation with respect to the rendered image data in order to semantically identify object(s) within the rendered image data.

As represented by block 618, in some implementations, the method 600 includes transmitting the display data to the see-through display for display. For example, with reference to FIG. 5, the display pipeline 550 provides the display data 559 to the see-through display 560. As represented by block 620, in some implementations, the method 600 includes displaying the display data via the see-through display.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    at an electronic device including one or more processors, a non-transitory memory, and a see-through display:
        detecting ambient light from a physical environment arriving at the see-through display;
        rendering image data including a representation of an object having predetermined display characteristics;
        determining at least one display correction value that, within a performance threshold, compensates for interference between the detected ambient light and the predetermined display characteristics of the representation of the object; and
        modifying at least a portion of the rendered image data in accordance with the at least one display correction value for display on the see-through display.

2. The method of claim 1, wherein:
    determining the at least one display correction value includes determining a tint value; and
    modifying at least the portion of the rendered image data in accordance with the at least one display correction value for display on the see-through display includes changing a tint level of at least the portion of rendered image data in accordance with the tint value for display on the see-through display.

3. The method of claim 2, wherein the tint value includes one or more of a luminance value associated with the physical environment and a contrast level between the predetermined display characteristics of the representation of the object and at least the portion of the rendered image.

4. The method of claim 1, wherein:
    determining the at least one display correction value includes determining a global tint value; and
    modifying at least the portion of the rendered image data in accordance with the at least one display correction value for display on the see-through display includes tinting the rendered image data for display on the see-through display according to the global tint value, including tinting the representation of the object with the global tint value.

5. The method of claim 1, wherein:
    determining the at least one display correction value includes determining a local tint value; and
    modifying at least the portion of the rendered image data in accordance with the at least one display correction value for display on the see-through display includes tinting according to the local tint value a portion of the rendered image data corresponding to a location of the representation of the object on the see-through display.

6. The method of claim 1, wherein modifying at least the portion of the rendered image data in accordance with the at least one display correction value for display on the see-through display includes applying multiple tinting layers to at least the portion of the rendered image data.

7. The method of claim 1, wherein the at least one display correction value includes grid data.

8. The method of claim 7, further comprising determining interpolated grid values by interpolating the grid data, wherein modifying at least the portion of the rendered image data in accordance with the at least one display correction value for display on the see-through display includes adjusting the representation of the object according to the interpolated grid values.

9. The method of claim 1, wherein detecting the ambient light includes determining scene content information associated with the physical environment.

10. The method of claim 1, wherein the at least one display correction value includes a combination of global luminance values associated with the physical environment and chromaticity values associated with the physical environment.

11. The method of claim 1, wherein the at least one display correction value includes a combination of local luminance values associated with the physical environment and chromaticity values associated with the physical environment.

12. The method of claim 1, wherein the at least one display correction value includes a combination of spatial luminance values associated with the physical environment and chromaticity values associated with the physical environment.

13. The method of claim 1, wherein modifying at least the portion of the rendered image data includes modifying at least the portion of the rendered image data to generate display data as a function of scene content information associated with the rendered image data.

14. A system comprising:
a see-through display, wherein the see-through display permits ambient light from a physical environment through the see-through display;
a sensor subsystem to detect ambient light from the physical environment arriving at the see-through display;
a display pipeline to render image data including a representation of an object having predetermined display characteristics; and
a correction values generator to determine at least one display correction value that, within a performance threshold, compensates for interference between the detected ambient light and the predetermined display characteristics of the representation of the object;
wherein the display pipeline is further operable to modify at least a portion of the rendered image data in accordance with the at least one display correction value for display on the see-through display.

15. The system of claim 14, wherein:
determining the at least one display correction value includes determining a tint value; and
modifying at least the portion of the rendered image data in accordance with the at least one display correction value for display on the see-through display includes changing a tint level of at least the portion of rendered image data in accordance with the tint value for display on the see-through display.

16. The system of claim 15, wherein the tint value includes one or more of a luminance value associated with the physical environment and a contrast level between the predetermined display characteristics of the representation of the object and at least the portion of the rendered image.

17. The system of claim 14, wherein:
determining the at least one display correction value includes determining a global tint value; and
modifying at least the portion of the rendered image data in accordance with the at least one display correction value for display on the see-through display includes tinting the rendered image data for display on the see-through display according to the global tint value, including tinting the representation of the object with the global tint value.

18. The system of claim 14, wherein:
determining the at least one display correction value includes determining a local tint value; and
modifying at least the portion of the rendered image data in accordance with the at least one display correction value for display on the see-through display includes tinting according to the local tint value a portion of the rendered image data corresponding to a location of the representation of the object on the see-through display.

19. The system of claim 14, wherein modifying at least the portion of the rendered image data in accordance with the at least one display correction value for display on the see-through display includes applying multiple tinting layers to at least the portion of the rendered image data.

20. The system of claim 14, wherein the correction values generator includes a grid data generator to generate grid data, wherein the at least one display correction value includes the grid data.

21. The system of claim 20, wherein the display pipeline includes a grid data interpolator to interpolate the grid data, and wherein the display pipeline generates display data as a function of the interpolated grid data.

22. An electronic device comprising:
one or more processors;
a non-transitory memory;
a see-through display; and
one or more programs, wherein the one or more programs are stored in the non-transitory memory and configured to be executed by the one or more processors, the one or more programs including instructions for:
detecting ambient light from a physical environment arriving at the see-through display;
rendering image data including a representation of an object having predetermined display characteristics;
determining at least one display correction value that, within a performance threshold, compensates for interference between the detected ambient light and the predetermined display characteristics of the representation of the object; and
modifying at least a portion of the rendered image data in accordance with the at least one display correction value for display on the see-through display.

23. The electronic device of claim 22, wherein:
determining the at least one display correction value includes determining a tint value; and
modifying at least the portion of the rendered image data in accordance with the at least one display correction value for display on the see-through display includes changing a tint level of at least the portion of rendered image data in accordance with the tint value for display on the see-through display.

24. The electronic device of claim 23, wherein the tint value includes one or more of a luminance value associated with the physical environment and a contrast level between the predetermined display characteristics of the representation of the object and at least the portion of the rendered image.

25. The electronic device of claim 22, wherein:
determining the at least one display correction value includes determining a global tint value; and
modifying at least the portion of the rendered image data in accordance with the at least one display correction value for display on the see-through display includes tinting the rendered image data for display on the see-through display according to the global tint value, including tinting the representation of the object with the global tint value.

* * * * *